Patented Oct. 9, 1951

2,571,074

UNITED STATES PATENT OFFICE 2,571,074

GLASS COMPOSITION

Ralph L. Tiede, Newark, Ohio, and Fay V. Tooley, Urbana, Ill., assignors to Owens-Corning Fiberglas Corporation, Toledo, Ohio, a corporation of Delaware No Drawing. Application November 2, 1948, Serial No. 58,027

8 Claims. (Cl. 106—50)

This invention relates to a glass composition which, by reason of its improved properties, is advantageously adaptable for the manufacture of glass articles such as glass fibers, particularly alkali-free glass fibers.

The strong chemical and physical attack of all molten glasses on the retaining walls of glass-melting furnaces is well known in the art. One phase of this problem is that in so eating away the surfaces of a refractory, for example, a refractory containing zirconia or zircon, the glass dissolves minute particles. Unfortunately, most molten glasses can dissolve only a very small amount of zircon or zirconia without undergoing appreciable changes in properties. When this low critical value is reached, the liquidus temperature of the glass rises rapidly and devitrification occurs. If the manufacture of glass articles from such a refractory saturated glass composition is to continue, higher temperatures must be used with resulting increased fuel costs. The higher temperatures, in turn, greatly accelerate the corrosion of the refractory. This causes more zircon or zirconia to dissolve in the molten glass, again raising the liquidus temperature, and again resulting in devitrification unless the operating temperature is again raised still higher. This destructive cycle continues until the working temperature required for the glass is so unduly high that it is unpractical, or even impossible because of the physical limits of the furnace, to operate further.

It is therefore an object of the present invention to provide a glass composition which at the normal operating temperature dissolves zircon or zirconia at appreciably slower rates.

Another object is to provide a glass composition having a liquidus temperature which is less affected by a given amount of dissolved zircon or zirconia.

In the manufacture of glass fibers, the viscosity of the glass melt is extremely important. If the viscosity is too low, the glass is much too fluid and may flood across the bottom of the glass feeder instead of flowing as streams of fine filaments or fibers. If the viscosity is too high, the glass is worked only with the greatest difficulty and the glass streams solidify almost immediately after leaving the feeder. It is therefore extremely difficult to attenuate the streams into desired fine fibers. Further, those fibers that are produced are more brittle.

In the making of glass fibers, experience has shown that a glass melt has a viscosity best suited for fiberizing when it is at a temperature dangerously close to its devitrification temperature. For example, the attenuating temperature may be about 2000° F. or lower which is in many cases only 100° F. to 200° F. above the devitrification temperature.

As fibers are formed from the streams flowing from the feeder, they cool and solidify very quickly due mostly to their great surface area per unit weight. The danger in operating so closely to the devitrification temperature as described is that the glass, while still fluid, may fall below this temperature in the fiber-forming zone and undergo devitrification thus interfering both with the efficiency of the process and the quality of the product. Indeed, it is not uncommon to have the discharge ends of the feeder orifices, through which the streams flow, at a temperature actually below the devitrification temperature of the glass when so operating. The net result may be inferior, brittle fibers containing perhaps even devitrified spots. To avoid this it is frequently necessary to operate at a temperature higher than that corresponding to the proper viscosity even though it means working with the melt at too low a viscosity and creating additional technical problems that such changes in operating conditions entail.

It is a further object of the present invention, therefore, to provide a glass composition that does not readily devitrify even when maintained and formed into glass articles at or near its devitrification temperature.

Wherever a high degree of chemical durability is essential, common glasses are inadequate, particularly when glasses are to be drawn into fibers for insulation or textiles. Fibers or filaments which are fine enough for such service present to the agencies of chemical attack an enormous specific surface in relation to the fiber diameter and mass. An alkali content comprising an alkali metal found in Group I of Mendeleef's Periodic Table tends to render the surfaces of such common glasses susceptible to attack by water. Water absorbed from the atmosphere dissolves the alkali and the resulting solution attacks the silicate in the glass and thereby starts a cycle which culminates in the destruction of the fiber. The common glasses are also unsuited for electrical insulation because of their alkali constituents. The presence of such constituents renders the glass itself a conductor, particularly at elevated temperatures. Also, the soluble alkali on the hygroscopic surface allows ionic conduction to proceed.

A still further object of the invention, then, is to provide a non-alkaline glass composition, that is, a glass substantially free from an alkali metal found in Group I of Mendeleef's Periodic Table, and which in the form of fibers has excellent electrical resistance and durability under attack by acid, water, or steam.

A still further object is to provide a glass composition having a comparatively low liquidus temperature so that it is not necessary to work the melt at higher, unsafe and inconvenient operating temperatures.

More specific objects and advantages are apparent from the following description which merely discloses and illustrates the invention and is not intended to limit the claims.

All the above objects are readily met by a composition having substantially these limits:

| | Weight per cent |
|---|---|
| CaO | 19 to 25 |
| $Al_2O_3$ | 12 to 16 |
| $SiO_2$ | 52 to 56 |
| $B_2O_3$ | 8 to 13 |

Other fluxes such as fluorspar may be substituted in amounts of 1 to 3 per cent for part of the boron oxide if desired. Alkali, for example, sodium oxide, in amounts of 1 to 3 per cent may also be used with reduced proportions of boron oxide in certain cases where such a high degree of resistance to water attack or very high electrical resistance is not essential. A very small amount of alkali, for instance, 1 or 2 per cent, may be present as an impurity or may be added if desired.

A specific example of a glass which has been found to be very satisfactory is:

| | Weight per cent |
|---|---|
| CaO | 22 |
| $Al_2O_3$ | 14 |
| $SiO_2$ | 54 |
| $B_2O_3$ | 10 |

Alkali-free glasses such as those of the present invention are highly critical in their allowable ranges of ingredients. Relatively small changes in glass composition or batch formula influence the properties of the resultant glass in such a way that it is difficult, if not unsuitable, to work in forming glass fibers successfully. It is impossible to predict in what direction the batch may safely be changed in order to produce a successful glass.

For example, in ordinary alkaline glasses, the eutectic and compound melting points are all so low that wide composition changes may be made without introducing devitrification hazards. Glasses of the type of the present invention, however, depend upon eutectic proportions and, consequently, are much more sensitive to composition changes. Slight changes displacing the composition from these eutectics make the glass refractory.

It was formerly thought that magnesia should always be present and in an amount not less than a certain value, for example, about 3 per cent. A deficiency of magnesia relative to this amount was thought to cause miscellaneous devitrification at temperatures slightly above desired attenuating temperatures.

Our discovery is a new alkali-free glass, fulfilling the previously described objects, in which we eliminate magnesia and in which we may increase the calcium oxide content to a greater value than heretofore thought allowable in such glasses.

In the glasses of this invention a decrease of calcium oxide below about 16 per cent causes silica devitrification and an increase above about 25 per cent causes devitrification of various calcium bearing compounds at the temperature to which it is necessary to heat the glass to obtain proper flow through the feeder outlets.

The silica content must also be maintained within the range specified since an excess above about 56 per cent causes silica devitrification, and a content less than about 52 per cent causes a decrease in durability of the glass, and also allows various calcium bearing compounds to devitrify at the temperatures employed in attenuating fibers. In the same manner, an alumina content higher than about 16 per cent or lower than about 12 per cent causes devitrification at attenuating temperatures.

Boron oxide contents higher than about 13 per cent decrease the durability of the glass. A boron oxide content below 8 per cent decreases the stability of the glass and causes rapid devitrification at temperatures dangerously close to the forming temperature range. Our boron oxide range in the present glasses is appreciably larger than heretofore thought possible. For example, it was previously thought that alkali-free glasses having more than 11 per cent boron oxide were difficult to make and were apt to be opaque and that the devitrification of calcium oxide precipitating with boron oxide was aggravated by such boron content. Our glasses may contain as much as 13 per cent boron oxide without exhibiting any of these undesirable properties.

Alkali-free glasses of this invention are especially characterized by their resistance to property change, such as a rising devitrification temperature, when a refractory such as zircon or zirconia is dissolved therein. For instance, when 2.5 per cent of zircon or zirconia is dissolved in our glasses, the devitrification temperature is about 1980° F. If a similar amount of zircon or zirconia is dissolved in the best prior glasses, the resulting devitrification temperature is in the order of 2090° F. requiring a higher working temperature. Further, not only does it take more dissolved refractory to affect such a rise in the present glasses, but the rate of that rise may be below that experienced with other glasses.

Glasses of this invention also have a very low devitrification rate. For example, it takes as much as twice as long for glasses of our invention to devitrify as for the best prior glasses. This enables the glass to be maintained in a molten state and fiberized at or near its devitrification temperature where it has a viscosity best suited for fiberizing. In this way, the glass batch may be fused, attenuated into fibrous form in this relatively dangerous temperature range and then supercooled to fibers before devitrification has a chance to start.

An important property of the present glasses is their high electrical resistance. This resistance throughout the body of the glass is enormous and, unless the surface is contaminated, there is negligible surface leakage. This is indicated by the results of tests performed on similar insulating tapes of fibrous mineral materials which were exposed 48 hours to a 90 per cent humidity, washed in distilled water, and tested at 100° F. The resistance of our non-alkaline glasses is as much as 130 times as great as the resistance of clean alkali glasses and 2100 times as great as that of asbestos.

Glasses made in accordance with the present invention may be not only formed into the usual pressed, blown, or extruded objects commonly found in the art, but may also be attenuated into extremely fine fibers by such methods, for example, as found in the United States Patent 2,133,236 to Slayter and Thomas. It is also possible to draw mechanically such glass into continuous filaments by means of a spool running at high speeds as disclosed in the United States Patent 2,234,986 to Slayter and Thomas.

Glass fibers produced by the above methods may be successfully fabricated into strands, twisted yarns, ply yarns, and then interwoven, knitted or braided into various textiles, such as fabrics as disclosed, for example, in the United States Patent 2,133,238 to Slayter and Thomas. Such fabrics have extremely high electrical resistance and resistance to moisture and other deleterious agents.

When subjected to steam for 48 hours, a treatment which destroys fibers of an alkali glass, no apparent deterioration occurs in fibers of the present glasses. The latter fibers also have excellent resistance to attack by moisture.

Glasses of this invention further have a relatively low liquidus temperature, for example, about 1950° F. to 2000° F. They are, consequently, a safer and more convenient type of glass with which to work and provide a savings in fuel costs.

Various modifications and variations may be made in the present invention within the spirit and scope of the appended claims.

We claim:

1. A glass having substantially the following composition by weight:

| | Per cent |
|---|---|
| $CaO$ | 19 to 25 |
| $Al_2O_3$ | 12 to 16 |
| $SiO_2$ | 52 to 56 |
| $B_2O_3$ | 8 to 13 |

2. Glass in the form of fine fibers having substantially the following composition by weight:

| | Per cent |
|---|---|
| $CaO$ | 19 to 25 |
| $Al_2O_3$ | 12 to 16 |
| $SiO_2$ | 52 to 56 |
| $B_2O_3$ | } 8 to 13 |
| Fluorspar | | said fluorspar comprising up to 3% of the total weight.

3. As an article of manufacture, fibrous glass having substantially this composition by weight:

| | Per cent |
|---|---|
| $CaO$ | 22 |
| $Al_2O_3$ | 14 |
| $SiO_2$ | 54 |
| $B_2O_3$ | 10 |

4. A fibrous glass textile, the glass having substantially the following composition by weight:

| | Per cent |
|---|---|
| $CaO$ | 19 to 25 |
| $Al_2O_3$ | 12 to 16 |
| $SiO_2$ | 52 to 56 |
| $B_2O_3$ | } 8 to 13 |
| Alkali oxide | | said alkali oxide being an oxide of an alkali metal found in Group 1 of Mendeleef's Periodic Table and comprising up to 3% of the total weight.

5. A glass textile of claim 4 in which the alkali oxide comprises sodium oxide.

6. A glass fiber yarn of intertwisted glass fibers having substantially the following composition by weight:

| | Per cent |
|---|---|
| $CaO$ | 19 to 25 |
| $Al_2O_3$ | 12 to 16 |
| $SiO_2$ | 52 to 56 |
| $B_2O_3$ | } 8 to 13 |
| Fluorspar | | said fluorspar comprising up to 3% of the total weight.

7. As an article of manufacture, a cloth comprising interwoven yarns formed of intertwisted glass fibers having substantially the following composition by weight:

| | Per cent |
|---|---|
| $CaO$ | 19 to 25 |
| $Al_2O_3$ | 12 to 16 |
| $SiO_2$ | 52 to 56 |
| $B_2O_3$ | } 8 to 13 |
| Alkali oxide | | said alkali oxide being an oxide of an alkali metal found in Group I of Mendeleef's Periodic Table and comprising up to 3% of the total weight.

8. A magnesia-free glass having substantially the following composition by weight:

| | Per cent |
|---|---|
| $CaO$ | 19 to 25 |
| $Al_2O_3$ | 12 to 16 |
| $SiO_2$ | 52 to 56 |
| $B_2O_3$ | 8 to 13 |

RALPH L. TIEDE.
FAY V. TOOLEY.

REFERENCES CITED

The following references are of record in the file of this patent:

UNITED STATES PATENTS

| Number | Name | Date |
|---|---|---|
| 2,334,961 | Schoenlaub | Nov. 23, 1943 |

FOREIGN PATENTS

| Number | Country | Date |
|---|---|---|
| 520,247 | Great Britain | 1940 |